US008255790B2

(12) United States Patent
Francker et al.

(10) Patent No.: US 8,255,790 B2
(45) Date of Patent: Aug. 28, 2012

(54) XML BASED FORM MODIFICATION WITH IMPORT/EXPORT CAPABILITY

(75) Inventors: Soren Francker, Kirkland, WA (US); Ann Martha Arellano Lopez, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1493 days.

(21) Appl. No.: 11/530,073

(22) Filed: Sep. 8, 2006

(65) Prior Publication Data
US 2008/0065978 A1    Mar. 13, 2008

(51) Int. Cl.
*G06F 17/00* (2006.01)
(52) U.S. Cl. ........................................ 715/221; 715/236
(58) Field of Classification Search .................. 715/215
See application file for complete search history.

(56) References Cited

U.S. PATENT DOCUMENTS

| | | | |
|---|---|---|---|
| 5,815,661 A | 9/1998 | Gosling | |
| 5,875,435 A | 2/1999 | Brown | |
| 5,978,834 A | 11/1999 | Simonoff | |
| 6,052,527 A | 4/2000 | Delcourt | |
| 6,078,322 A | 6/2000 | Simonoff | |
| 6,101,328 A | 8/2000 | Bakshi | |
| 6,119,130 A | 9/2000 | Nguyen | |
| 6,363,362 B1 | 3/2002 | Burfield | |
| 6,370,682 B1 | 4/2002 | Eckardt | |
| 6,529,909 B1 | 3/2003 | Bowman-Amuah | |
| 6,613,098 B1* | 9/2003 | Sorge et al. ................... | 715/234 |
| 6,665,677 B1 | 12/2003 | Wotring | |
| 6,671,853 B1* | 12/2003 | Burkett et al. ................ | 715/235 |
| 6,725,453 B1 | 4/2004 | Lucas | |
| 6,785,685 B2* | 8/2004 | Soetarman et al. ................... | 1/1 |
| 6,810,429 B1* | 10/2004 | Walsh et al. ................... | 709/246 |
| 6,826,568 B2 | 11/2004 | Bernstein | |
| 6,826,750 B1 | 11/2004 | Curtis | |
| 6,853,997 B2 | 2/2005 | Wotring | |
| 6,862,616 B1 | 3/2005 | Tompkins | |
| 6,862,735 B1 | 3/2005 | Slaughter | |
| 6,898,604 B1* | 5/2005 | Ballinger et al. ............. | 707/101 |

(Continued)

FOREIGN PATENT DOCUMENTS
WO    0120504    3/2001
(Continued)

OTHER PUBLICATIONS

Title: Overview of the XML and Binary converter Author: Ed Lai Date: Jul. 2006 Url : <http://www.datamech.com/XMLForm/aboutXmlAndBinary.html> PDF attached with associated Dates of each web pages accessed.*

(Continued)

*Primary Examiner* — Doug Hutton, Jr.
*Assistant Examiner* — Mustafa Amin
(74) *Attorney, Agent, or Firm* — Westman, Champlin & Kelly, P.A.

(57) ABSTRACT

A form user interface modification engine for use in customizing forms of an application is provided. The modification engine includes an export component which retrieves a first binary format form for customization. The export component deserializes the first binary format form and converts the first binary format form into a first XML format form. An import component of the modification engine receives a customized XML format form created using the first XML format form and serializes the customized XML format form. The customized XML format form is then stored as an XML layer with a reference to the associated binary format form.

17 Claims, 6 Drawing Sheets

U.S. PATENT DOCUMENTS

| | | | |
|---|---|---|---|
| 6,941,510 B1* | 9/2005 | Ozzie et al. | 715/234 |
| 6,986,148 B2 | 1/2006 | Johnson, Jr. | |
| 6,993,745 B1* | 1/2006 | Ballantyne et al. | 717/109 |
| 7,013,306 B1* | 3/2006 | Turba et al. | 1/1 |
| 7,031,956 B1 | 4/2006 | Lee | |
| 7,065,560 B2 | 6/2006 | Erickson | |
| 7,069,562 B2 | 6/2006 | Kushnirskiy | |
| 7,130,863 B2 | 10/2006 | Diab | |
| 7,158,967 B1* | 1/2007 | Turba et al. | 1/1 |
| 7,158,990 B1* | 1/2007 | Guo et al. | 1/1 |
| 7,178,142 B2 | 2/2007 | Bennett | |
| 7,194,679 B1* | 3/2007 | Green | 715/233 |
| 7,209,892 B1* | 4/2007 | Galuten et al. | 705/26.62 |
| 7,350,199 B2* | 3/2008 | Ito et al. | 717/141 |
| 7,418,456 B2 | 8/2008 | Charlet | |
| 7,441,185 B2* | 10/2008 | Coulson et al. | 715/234 |
| 7,458,073 B1 | 11/2008 | Darling | |
| 7,475,289 B2* | 1/2009 | Rosaria et al. | 714/38.1 |
| 7,539,701 B2 | 5/2009 | Sethi | |
| 7,559,020 B2* | 7/2009 | Jazdzewski et al. | 715/234 |
| 7,627,589 B2* | 12/2009 | Cheslow | 1/1 |
| 7,631,291 B2* | 12/2009 | Shukla et al. | 717/107 |
| 7,681,114 B2* | 3/2010 | Ambrosino et al. | 715/201 |
| 7,698,398 B1* | 4/2010 | Lai | 709/223 |
| 7,779,402 B2 | 8/2010 | Abernethy | |
| 7,802,180 B2* | 9/2010 | Warner et al. | 715/234 |
| 7,831,693 B2* | 11/2010 | Lai | 709/220 |
| 7,974,993 B2 | 7/2011 | Blanch | |
| 8,060,652 B2* | 11/2011 | Eller | 709/246 |
| 8,069,435 B1* | 11/2011 | Lai | 717/106 |
| 8,126,841 B2* | 2/2012 | Gordon et al. | 707/609 |
| 2002/0019972 A1 | 2/2002 | Grier | |
| 2002/0078437 A1 | 6/2002 | Grassman | |
| 2002/0156814 A1 | 10/2002 | Ho | |
| 2003/0018658 A1 | 1/2003 | Suermondt | |
| 2003/0046317 A1* | 3/2003 | Cseri et al. | 707/513 |
| 2003/0097433 A1 | 5/2003 | Park | |
| 2003/0130845 A1* | 7/2003 | Poplawski | 704/255 |
| 2003/0159135 A1 | 8/2003 | Hiller | |
| 2003/0172196 A1* | 9/2003 | Hejlsberg et al. | 709/328 |
| 2003/0191803 A1* | 10/2003 | Chinnici et al. | 709/203 |
| 2003/0192036 A1 | 10/2003 | Karkare | |
| 2003/0216990 A1 | 11/2003 | Star | |
| 2004/0044965 A1* | 3/2004 | Toyama et al. | 715/523 |
| 2004/0049736 A1* | 3/2004 | Al-Azzawe et al. | 715/513 |
| 2004/0054626 A1 | 3/2004 | Fuentes | |
| 2004/0143791 A1* | 7/2004 | Ito et al. | 715/513 |
| 2004/0153462 A1 | 8/2004 | Bardwell | |
| 2004/0181753 A1 | 9/2004 | Michaelides | |
| 2004/0199876 A1* | 10/2004 | Ethier et al. | 715/523 |
| 2004/0230569 A1* | 11/2004 | Rys et al. | 707/3 |
| 2004/0249762 A1 | 12/2004 | Garibay | |
| 2005/0022154 A1 | 1/2005 | Chung | |
| 2005/0044197 A1* | 2/2005 | Lai | 709/223 |
| 2005/0060284 A1* | 3/2005 | Ruby et al. | 707/1 |
| 2005/0065942 A1 | 3/2005 | Diab | |
| 2005/0091231 A1* | 4/2005 | Pal et al. | 707/100 |
| 2005/0097504 A1* | 5/2005 | Ballinger et al. | 717/100 |
| 2005/0102370 A1 | 5/2005 | Lin | |
| 2005/0108627 A1* | 5/2005 | Mireku | 715/513 |
| 2005/0144622 A1* | 6/2005 | Ballinger et al. | 719/315 |
| 2005/0240467 A1 | 10/2005 | Eckart | |
| 2005/0273709 A1* | 12/2005 | Lough et al. | 715/517 |
| 2005/0278289 A1* | 12/2005 | Gauweiler et al. | 707/1 |
| 2006/0080289 A1* | 4/2006 | Brunswig et al. | 707/3 |
| 2006/0117061 A1* | 6/2006 | Weiss | 707/104.1 |
| 2006/0161912 A1 | 7/2006 | Barrs | |
| 2006/0168513 A1* | 7/2006 | Coulson et al. | 715/513 |
| 2006/0184918 A1* | 8/2006 | Rosaria et al. | 717/124 |
| 2006/0190814 A1 | 8/2006 | Collie | |
| 2006/0218160 A1* | 9/2006 | Bhatia | 707/100 |
| 2006/0230339 A1* | 10/2006 | Achanta et al. | 715/513 |
| 2006/0235862 A1* | 10/2006 | Heuer et al. | 707/101 |
| 2007/0005622 A1* | 1/2007 | Fernandes et al. | 707/101 |
| 2007/0083538 A1* | 4/2007 | Roy et al. | 707/101 |
| 2007/0112714 A1* | 5/2007 | Fairweather | 706/46 |
| 2007/0192679 A1* | 8/2007 | Foushee et al. | 715/506 |
| 2007/0271305 A1* | 11/2007 | Chandrasekar et al. | 707/200 |
| 2007/0294684 A1 | 12/2007 | Kumashiro | |
| 2008/0065978 A1 | 3/2008 | Francker | |
| 2008/0098291 A1* | 4/2008 | Bradley et al. | 715/223 |
| 2008/0134019 A1 | 6/2008 | Wake | |
| 2008/0281815 A1* | 11/2008 | Narsude | 707/5 |
| 2009/0112902 A1* | 4/2009 | Sthanikam et al. | 707/101 |

FOREIGN PATENT DOCUMENTS

| | | |
|---|---|---|
| WO | 0157613 | 8/2001 |
| WO | 2006032063 | 3/2006 |

OTHER PUBLICATIONS

Title: BizTalk 2004 Flat File Schema Author: Tomas Restrepo Date: Jun. 23, 2006 Url: <http://www.winterdom.com/dev/bts/BTSFFSchemaTut1.html>.*

Serialization/Deserialization in NET Author: Mark Strawmyer Date: Nov. 18, 2003 url: <http://www.codeguru.com/columns/dotnet/print.php/c5821>.*

Title: Fast Infoset Author: Paul Sandoz, Alessando Triglia, Santiago Pericas-Geertsen, Date: Jun. 2004 Url: <http://java.sun.com/developer/technicalArticles/xml/fastinfoset/>.*

Morris, "XmlSerializer to Serialize Class to Xml and Buld Load Data", Oct. 13, 2004, pp. 1-5, URL<http://www.eggheadcafe.com/articles/xmlserializer_bulkload.asp>.*

Subramanian, "XML serialization in .NET", Feb. 2003, pp. 1-10, URL<http://www.agiledeveloper.com/articles/XMLSerialization.pdf>.*

Wen et al., "BinX-A Tool for Binary File Access", Apr. 27, 2005, pp. 1-11, <http://web.archive.org/web/20050427095948/http://www.gridpp.ac.uk/gridpp9/gridpp9_binx.ppt>.*

"BinXed: The BinX editor Users Guide", 2005, University of Edinburgh, pp. 1-15, <http://www.ediktorg.uk/binx/docs/BinXedUser-Manual.pdf>.*

Publisher: Korean Intellectual Property Office; Author: Kwon, Oh Seong; Title: Written Opinion of the International Searching Authority for PCT Application No. PCT/US2007/079579; Relevant pp. 1-5; Publication Date: Sep. 26, 2007; Place of Publication: believed to be Korea.

Publisher: Sun Microsystems, Inc.; Author: Sun Microsystems, Inc.; Title: The OpenOffice.org Source Project, Technical Overview; Relevant pp. 1-36; Publication Date: 2000; Place of Publication: believed to be United States.

Publisher: unknown; Author: unknown; Title: Overview of the XML and binary converter; Relevant pp. 1-42; Publication Date: Jul. 2006; Place of Publication: http://www.datamech.com/XMLForm/aboutXmalAndBinary.html.

Publisher: unknown; Author: Tomas Restrepo; Title: BizTalk 2004 Flat File Schema Tutorial 1; Relevant pp. 1-8; Publication Date: Jun. 23, 2006; Place of Publication: http://web.archive.org/web/20060623123325/www.winterdom.com/dev/bts/BTSFFSSchemaTutl.html.

Publisher: Codeguru; Author: Mark Stawmyer; Title: Serialization/Deserialization in .NET; Relevant pp. 1-6; Publication Date: Nov. 18, 2003; Place of Publication: http://www.codeguru.com/columns/dotnet/article.php/c5821.

Publisher: unknown; Author: Paul Sandoz et al.; Title: Fast Infoset; Relevant pp. 1-14; Publication Date: Jun. 2004; Place of Publication: http://java.sun.com/developer/technicalArticles/xml/fastinfoset.

Publisher: USPTO; Author: Ho, Binh Van; Title: Office Action dated Oct. 1, 2008 for U.S. Appl. No. 11/601,951; Relevant pp. 1-11; Publication Date: Oct. 1, 2008; Place of Publication: USPTO.

Publisher: USPTO; Author: Ho, Binh Van; Title: Notice of Allowance and Fee(s) Due for U.S. Appl. No. 11/601,951; Relevant pp. 1-13; Publication Date: Mar. 10, 2009; Place of Publication: USPTO.

* cited by examiner

```
                506       502        504
                 \         \          \
<FormLayout Name="Service" FormID="Microsoft.BusinessSolutions.SmallBusinessAccounting.UI.InvoiceForm"
 Type="Invoice" AllowMultipleTabs="false" xmlns="http://schemas.microsoft.com/sba/2006/formlayout">
  <Pages>
    <Page>                       508
      <CellStackers>
        <CellStacker Position="TopLeft">
          <Cells>
            <Cell>
              <Controls>          510
                <Control ID="customerGroupHeader">
                  <Visible>true</Visible>
                </Control>
              </Controls>
            </Cell>
            <Cell>
              <Controls>
                <Control ID="CustomerAccount">        512
                  <Visible>true</Visible>
                  <CustomizationLabel>Patient name:</CustomizationLabel>
                </Control>
              </Controls>
            </Cell>
            <Cell>
              <Controls>
                <Control ID="Contact">
                  <Visible>true</Visible>
                </Control>
              </Controls>
            </Cell>
          </Cells>
        </CellStacker>
      </CellStackers>
    </Page>
  </Pages>
  <Grids>
    <Grid>
      ...
    </Grid>
  </Grids>
</FormLayout>
```

XML BASED FORM MODIFICATION WITH IMPORT/EXPORT CAPABILITY

BACKGROUND

Software companies frequently offer software products with a set of initial forms, which are the user interfaces (UIs) of the software product. An example of such a software product is a small business accounting application or system in which multiple accounting forms are provided with the initial product. Such forms might include invoice forms, receipt forms, purchase order forms, various accounting forms, etc. This scenario of multiple forms provided with a software product is common to many types of applications, and is not limited to accounting software products.

In many instances, independent software vendors (ISVs) desire to make customizations to software products sold by the original software company. These customizations are often in the form of customizations to the forms provided with the software product. The forms can be tailored for a more specific use of a particular client or industry by changing the names of control labels, changing sizes of the controls, etc. This customization process can be challenging for ISVs, creating resistance to use of the software product.

Form templates for software products are often stored and exposed with binary code via a software development kit or tool. Since binary code can be difficult to work with, this can be problematic for ISVs, making it challenging for the ISVs to identify controls (field types, labels, sizes, buttons, tabs, etc.) on a form. With the form templates exposed to the ISVs in the form of binary code, any customizations that the ISVs do make will be difficult to maintain in future versions of the software product, potentially creating more work for the ISVs in the future.

Another problem which is sometimes experienced by ISVs and/or end users who attempt to customize a form is that it is difficult to apply those modifications to different databases or users of the same form. For example, in an accounting software product, the accounting of multiple companies can be managed. If a particular form is customized in one customer's database, the modifications frequently do not easily transfer to the same forms when used in a second customer's database. Thus, in some instances, it may be necessary to repeat form customization efforts for each of multiple different customers, companies, databases, etc.

The discussion above is merely provided for general background information and is not intended to be used as an aid in determining the scope of the claimed subject matter.

SUMMARY

Disclosed embodiments are provided by way of example, and include form user interface modification engines which can be used in customization of form user interfaces (UIs) of an application product or system. Also disclosed are example form customization systems and methods. The following embodiments are provided as examples, and those of skill in the art will recognize that the disclosed concepts can be applied to other example embodiments as well. This disclosure is intended to cover such other example embodiments as well.

A form user interface modification engine for use in customizing forms of an application is provided. The modification engine includes an export component which retrieves a first binary format form for customization. The export component deserializes the first binary format form and converts the first binary format form into a first XML format form. An import component of the modification engine receives a customized XML format form created using the first XML format form and serializes the customized XML format form. The customized XML format form is then stored as an XML layer and an associated binary format form.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 5 is an example of an XML form.

DETAILED DESCRIPTION

Generally, the easier it is for independent software vendors (ISVs) to integrate a software product provided by a software company with the ISV's own solutions, the more efficiently the processes of customizing software applications will work. Also, making the customization process easier for ISVs and for end users will often increase acceptance and demand for the software product. Disclosed embodiments provide Extensible Markup Language (XML) based form modification with import/export capability to address some of the challenges that ISVs, as well as some end users, face when trying to surface or implement their own solutions inside of a software product in which the UI forms are stored and exposed in a binary format.

As mentioned, form templates of application programs or software products have conventionally often been exposed for customization with binary code using a software development kit (SDK) or tool. This makes it difficult for ISVs to identify the controls (field types, labels, sizes, buttons, tabs, etc.) on a form. If the form templates continue to be exposed with binary code it is difficult to maintain form templates in future versions of the underlying application. Disclosed embodiments address this at least partially by replacing the binary code of forms with an XML format. By exposing forms to ISVs and/or end users with XML, it is much easier to identify all controls on a form, to modify the controls, and to add new controls that tie into the ISVs solutions (integration to external components). In addition, using the disclosed concepts, an ISV now can export a modified form and make it available for end users to download and import in their copy of the application or system.

Figure 1:
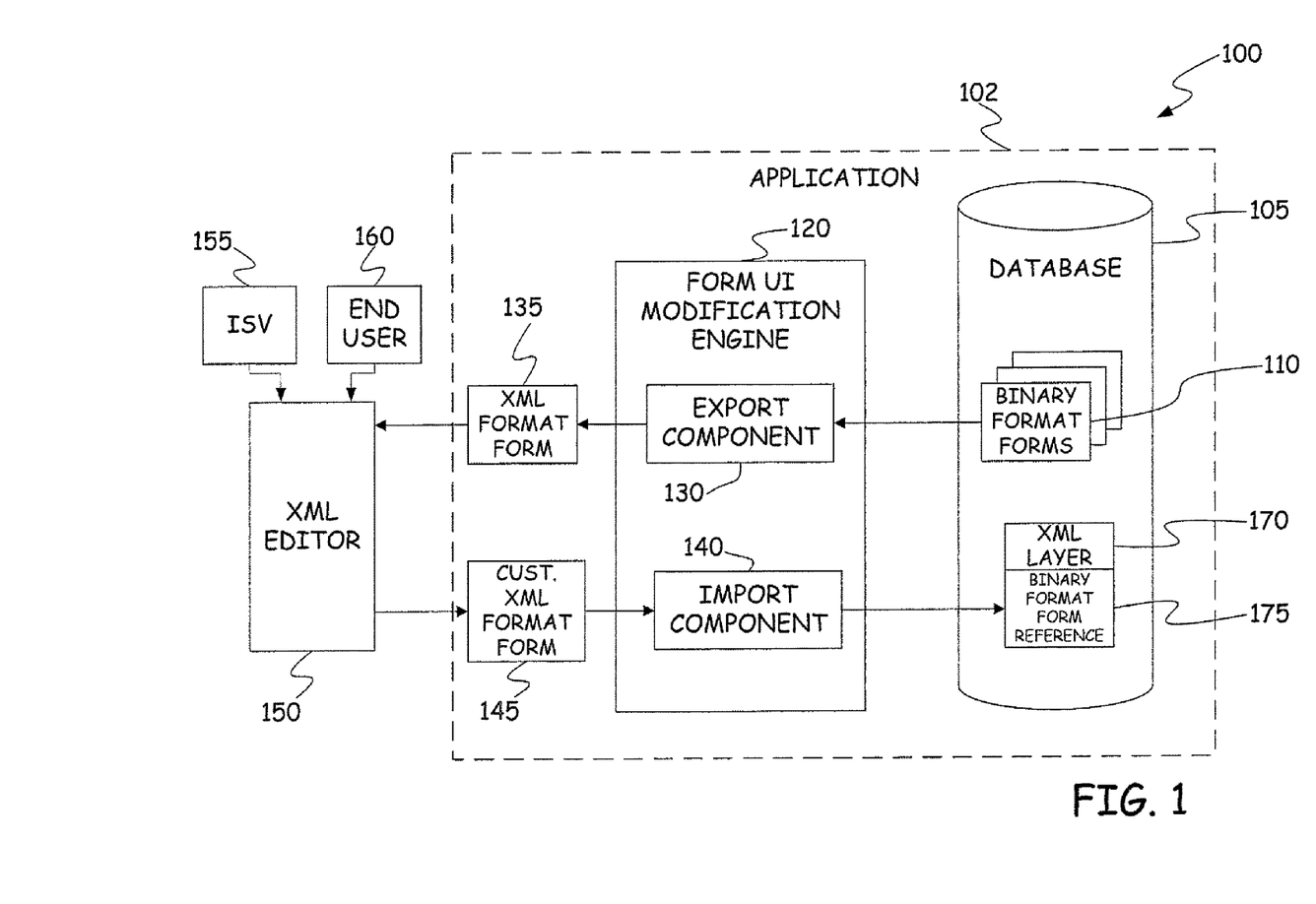
FIG. 1 is a block diagram illustrating one example form user interface modification engine embodiment and one example form customization system embodiment.

Referring now to FIG. 1, shown are a form user interface modification engine 120 and a form customization system 100 which uses the modification engine. The form modification engine 120 and system 100 can be used to customize forms of an application 102. In some example embodiments, application 102 is a business accounting application or system, but application 102 is not limited to this particular field of use. Engine 120 and/or system 100 can be embodied in application 102, but this need not be the case. Instead, engine 120 and/or system 100 can be used in conjunction with application 102. Application 102 is shown in dashed lines to represent this optional relationship. Other components can also be optional, whether represented in dashed lines or not.

System 100 includes a database 105 which stores a set of application user interface forms (represented at 110 in FIG. 1) in a binary format as is commonly the case in applications and systems. A form user interface modification engine 120 is used to convert the binary format forms 110 into XML format forms 135 for modification/customization using an XML editor 150. The XML editor 150 need not be considered a component of system 100 in most embodiments, as any of a wide number of readily available XML editors can be used to edit the XML code of XML form 135 to obtain a customized XML format form 145. This customization can be made by either of an ISV 155 or an end user 160.

Form modification engine 120 includes an export component 130 configured to retrieve a first form 110 from database 105, and to convert the first form from binary format into a first XML format form 135. This conversion process from binary to XML can be accomplished using a deserialization step which export component 130 is configured to implement. For example, export component 130 can be configured to utilize a deserialization technique such as the one available in the Microsoft® .NET framework. Other serialization and deserialization techniques can be used as well.

Serialization is a process of taking an object and converting it to a format in which it can be transported across a network or persisted to a storage location. The storage location could be as simple as using a file or a database. The serialized format contains the objects state information. Deserialization is the process of using the serialized state information to reconstruct the object from the serialized state to its original state. In essence, the process of serialization allows an object to be serialized, shipped across the network for remoting or persisted in a storage location, and then be reconstructed for use at a later point in time.

For example, two of the formats provided by the Microsoft® .NET framework to which objects can be serialized include binary and XML. The format is controlled based upon what object is used to perform the serialization. In the .NET framework, the XML format is produced by using the System.Xml.Serialization.XmlSerializer class. The binary format is produced by using classes under the System.Runtime.Serialization.Formatters namespace. These classes are provided as examples only, and disclosed embodiments are not limited to any particular serialization or deserialization techniques.

Referring back to FIG. 1, engine 120 also includes an import component 140 configured to receive a customized XML format form 145 created using the first XML format form 135. As noted, the customized XML format form 145 will frequently be created by an ISV 155, but can also be created by an end user 160. Input component 140 is configured to store the customized XML format form 145 in database 105 as an XML layer 170 with a reference (illustrated at 175) to the associated binary format form 110. As such, import component 140 can create the XML layer 170 using a serialization process or technique as discussed above. The template information is stored in a Template class that is serialized to database 105. This structure contains the binding information for all controls in the form, as well as order and labels.

By deserializing the binary format forms 110 into XML format forms 135, the customization task is simplified, allowing these forms to be revised using a standard XML editor. By storing the modified or customized form 145 as an XML layer 170 on top of the associated binary format form 110, the ability to apply a single customization effort across the same form in different databases is greatly enhanced. For example, in some embodiments, the XML layer 170 includes XML code indicative of differences between the customized XML format form 145 and the first XML format form 135. Then, to share the customized form with end users or to apply the customizations of the form to different databases (for example for different clients or businesses), the XML layer 170 can be exported to different databases and applied to the associated binary format form in those databases to facilitate this process. This also allows the binary format forms 110 of the application to be upgraded in future versions of the application 102, with XML layer 170 being applied to the new versions of the binary forms in some embodiments. Upgrading the XML can be accomplished using extensible Stylesheet Language (XSL) transformations.

Figure 2:
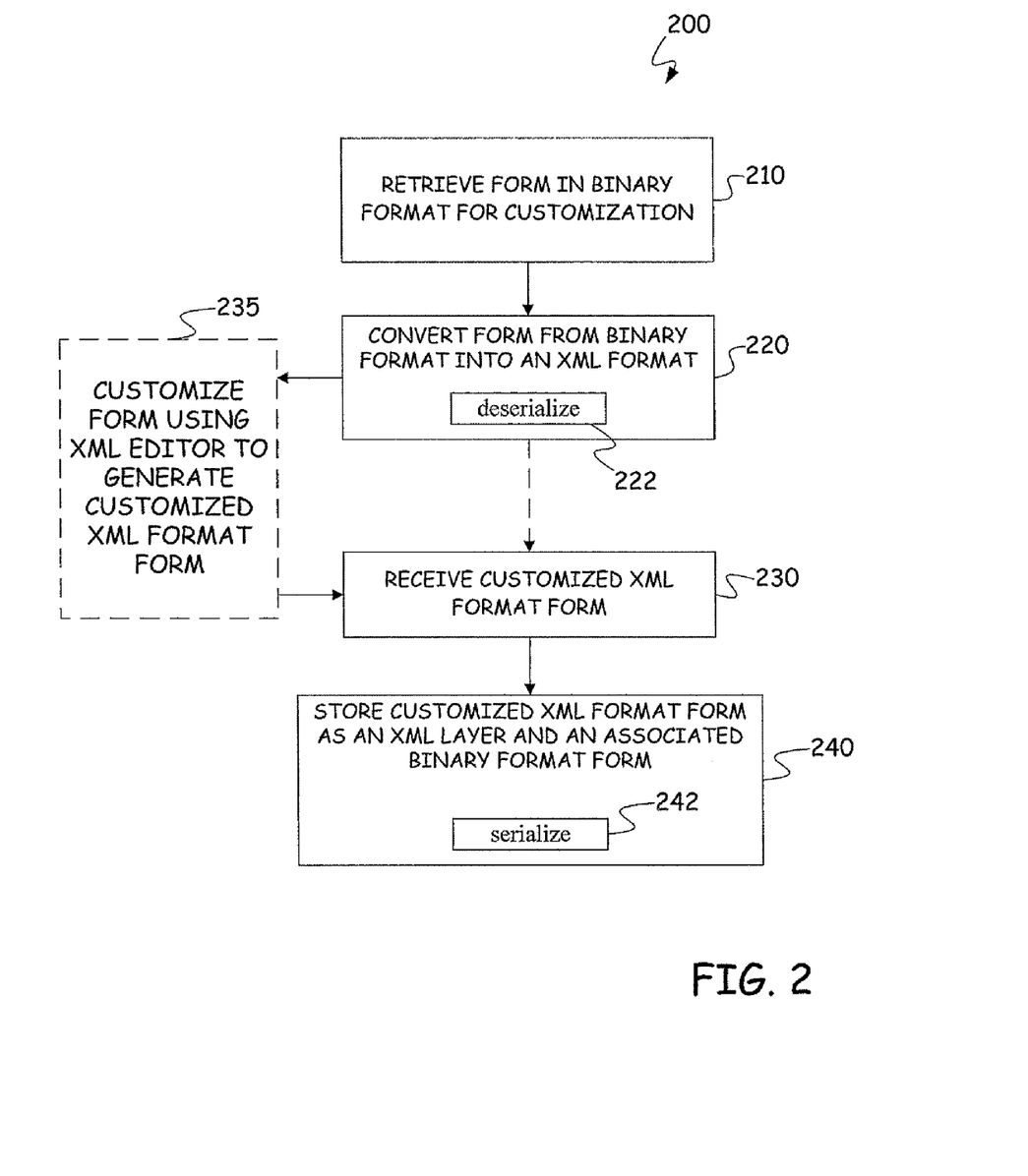
FIG. 2 is a flow diagram illustrating an example method embodiment.

Referring now to FIG. 2, shown is a flow diagram 200 illustrating a method of customizing forms of an application as described above. As shown at step 210, the method includes retrieving a first form 110 for customization. As in the above example, form 110 is a binary format form. Then, at step 220, the first form is converted from the binary format into an XML format shown at form 135 in FIG. 1. At step 230, a customized XML format form 145, created using the first form in XML format 135, is received. The customized XML format form 145 is then stored as an XML layer 170 and an associated binary format form 110 as shown at step 240. Consistent with the above discussion, the step 220 of converting from binary format to XML format can include a deserialization step or technique represented in FIG. 2 at 222. Likewise, the step 240 of storing the customized XML format form can include a serialization step or technique as represented in FIG. 2 at 242. In some embodiments, the method can optionally include the step 235 of performing the customizations to the first form by editing the first form in XML format using an XML editor to generate the customized XML format form 145.

Figure 3:
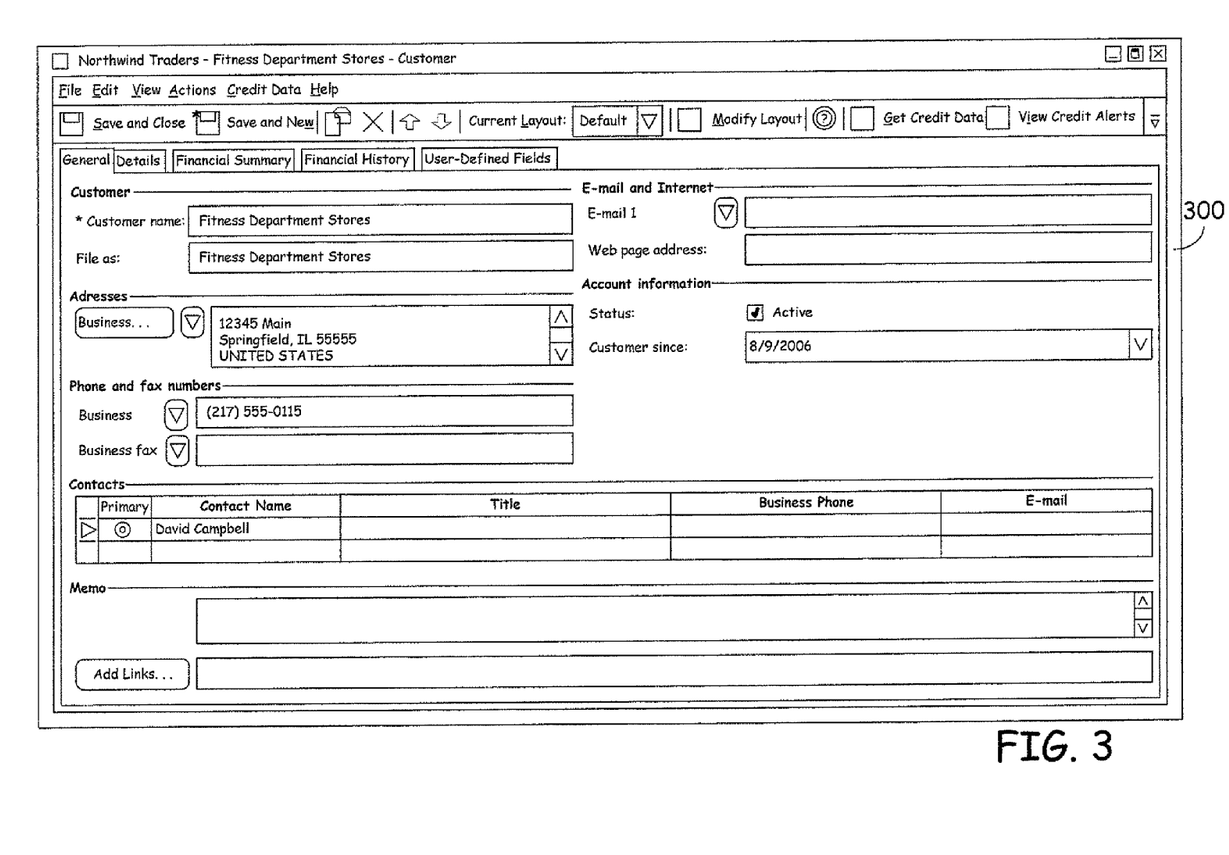
FIG. 3 is a line drawing illustration of an example form prior to customization.

The use of disclosed embodiments can be appreciated by considering an example. Suppose that an ISV specialized in customer credit rating wants to surface credit rating information generated in their credit rating system (CRS) on customer accounts in a small business accounting application. Assume that for customization of a customer account form the end user also needs a button which pulls data from the CRS to the credit rating fields (CRS fields) on the Customer form. An example of the original Customer form without ISV modifications is shown at 300 in FIG. 3.

Figure 4:
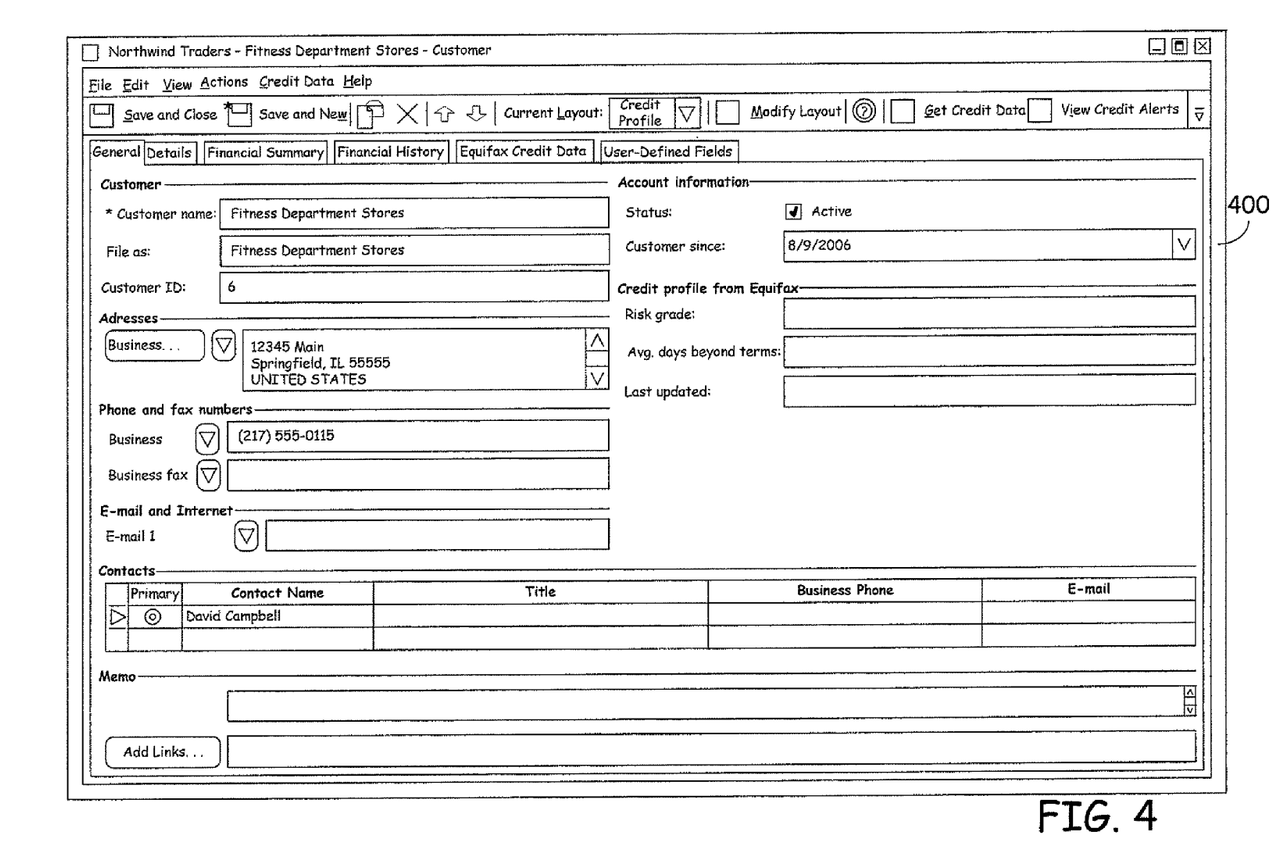
FIG. 4 is a line drawing illustration of an example form after customization.

Using the form modifier techniques described above, the ISV builds a new template of the customer form (shown at 400 in FIG. 4) which has a new group field header that holds the credit rating specific data and the desired added buttons or controls. Also, some of the standard fields on the customer form could be removed to another tab to make the appearance of the CRS fields more discoverable and easy to access. Once the newly customized form is saved as an XML layer on top of the binary form, the new template can be made available so the end-user can download and install it. The new template is available along with the list of user defined form layouts.

Referring now to FIG. 5, shown is an example of an XML schema which is used to represent customizations or modifications to an XML document. In this example schema (form layout), the top level element is the "FormLayout". It contains properties to identify what sort of layout it is and what sort of form it is using. There is a property called "Name" 502, which is used to identify one layout from another. In this example, the Name property has a value of "Service". The next property in the FormLayout is the "FormID" 504, which is a property that serves to identify what the particular layout is for. In this example, this property has a value which identifies that this schema is for an "InvoiceForm". A Type property 506 is shown to have a value of "Invoice", which the user may see as the form name. The next property is an internal property 508 which defines which of several types of forms is being used, for example differentiating between those that allow tab control, and those that do not.

Below these properties are a series of containers <Pages>, <Page>, <CellStackers>, etc. with a defined hierarchy which details what is contained in the form. CellStacker represents a group of fields. For customization, an ISV will typically revise the controls of the form. A control is essentially a field. In this example, the control 510 having an ID of "customer-GroupHeader" has a "visible" property, which controls whether or not this field is shown to a user of the form. Other controls are also shown, such as the CustomizationLabel control 512. In this example, the CustomerAccount name or ID is changed by the ISV to read "Patient name", which is what will then be displayed to the end user.

Figure 6:
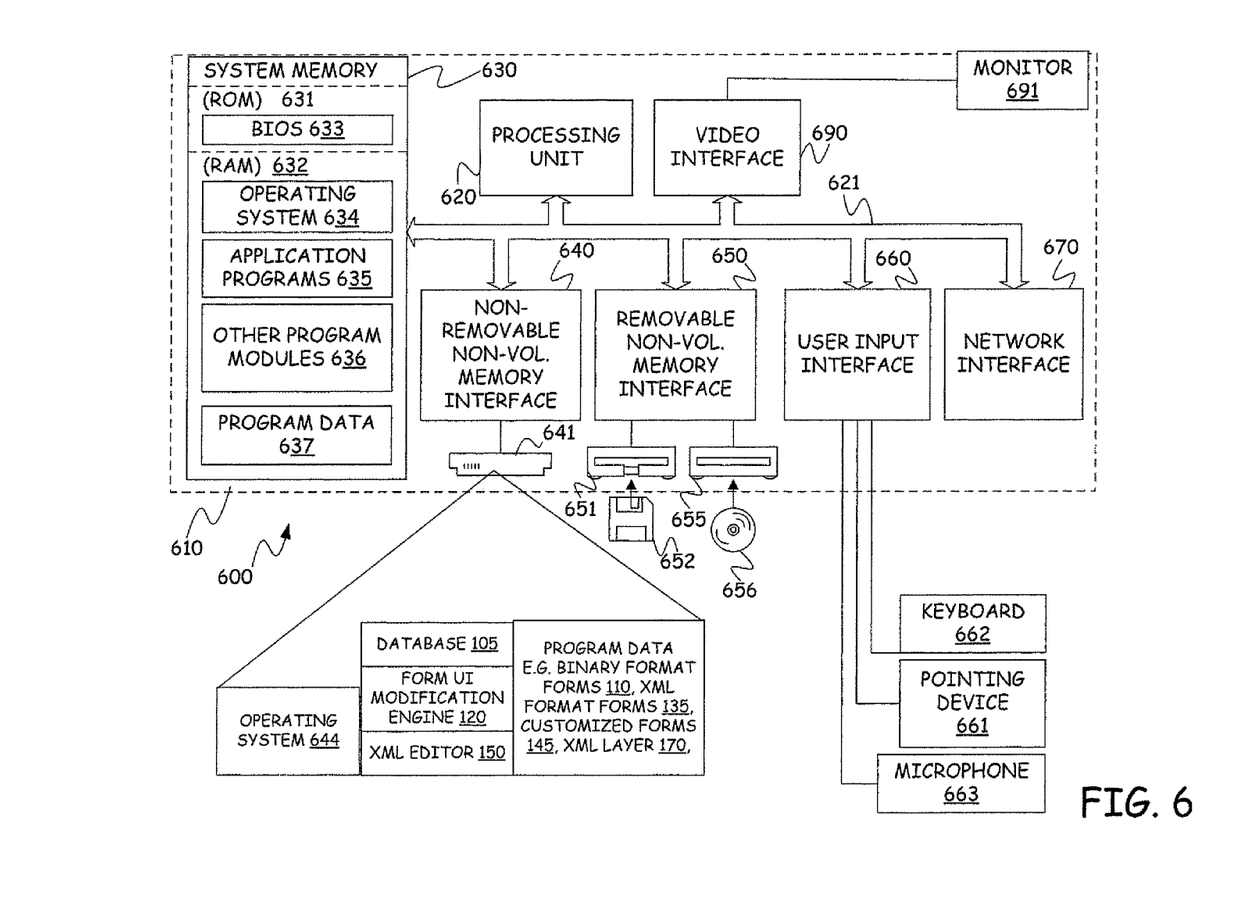
FIG. 6 is a block diagram illustrating an exemplary computing environment configured to implement modification engine embodiments, form customization system embodiments and/or customization method embodiments.

FIG. 6 illustrates an example of a suitable computing system environment 600 on which the concepts herein described may be implemented. In particular, computing system environment 600 can be used to implement form user interface modification engine 120, customization system 100, database 105, XML editor 150, binary format forms 110, XML format forms 135, customized forms 145, XML layer 170, etc. as illustrated in FIG. 6 and discussed in an exemplary manner below. Nevertheless, the computing system environment 600 is again only one example of a suitable computing environment for each of these computers and is not intended to suggest any limitation as to the scope of use or functionality of the description below. Neither should the computing environment 600 be interpreted as having any dependency or requirement relating to any one or combination of components illustrated in the exemplary operating environment 600.

As shown in FIG. 6, an exemplary system includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter commands and information into the computer 610 through input devices such as a keyboard 662, and a pointing device 661, such as a mouse, trackball or touch pad. Other input devices (not shown) may include a scanner or the like. These and other input devices are often connected to the processing unit 620 through a user input interface 660 that is coupled to the system bus, but may be connected by other interface and bus structures, such as a parallel port or a universal serial bus (USB). A monitor 691 or other type of display device is also connected to the system bus 621 via an interface, such as a video interface 690.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A form user interface modification system for use in customizing forms of an application, the form user interface modification system comprising:
   a processor of a computer;
   an export component, implemented at least in part on the processor of the computer, which retrieves a first binary format form for customization from a form database, wherein the export component generates a first extensible markup language (XML) format form by converting the first binary format form into XML format; and
   an import component, implemented at least in part on the processor of the computer, which receives a customized XML format form creating using the first XML format form, wherein the import component stores the customized XML format form as an XML layer that includes XML code indicative of differences between the customized XML format form and the first XML format form, wherein the XML layer is stored in the form database with a reference to the associated first binary format form stored in the form database that was used to generate the first XML format form.

2. The form user interface modification system of claim 1, wherein the import component is configured to serialize the customized XML format form and to store the customized XML format form as an XML layer on top of the associated first binary format form.

3. The form user interface modification system of claim 2, wherein the import component is configured to store the XML layer with a copy of the first binary format form.

4. The form user interface modification system of claim 1, wherein the export component is configured to deserialize the first binary format form and to export the first XML format form to an XML editor for use in creating the customized XML format form.

5. The form user interface modification system of claim 4, wherein the import component is configured to receive the customized XML format form from the XML editor.

6. The form user interface modification system of claim 1, wherein the import component is configured to store the customized XML format form as an XML layer on top of the associated first binary format form without modifying the associated first binary format form stored in the database.

7. The form user interface modification system of claim 1, wherein the import component stores the XML layer with a copy of the first binary format form in the form database.

8. A form customization system comprising:
   a processor;
   a database which stores a set of application user interface forms in binary format; and
   a form user interface modification engine implemented at least in part on the processor, the form user interface modification engine comprising:
      an export component that retrieves a first form of the set of application user interface forms from the database and generates a first extensible markup language (XML) format form to be used in form customization converting the first form from binary format to XML format, wherein the export component deserializes the first form when retrieving the first form from the database;
      an XML editor configured to edit XML code of the first XML format form to obtain a customized XML format form; and
      an import component that receives the customized XML format form created using the first XML format form, serializes the customized XML format form, and stores the customized XML format form in the database as an XML layer with a reference to the associated first binary format form stored in the database that was used to generate the first XML format form, wherein the XML layer XML code indicative of differences between the customized XML format form and the first XML format form.

9. The form customization system of claim 8, wherein the XML editor is configured to edit XML code of the first XML format form based on an input received from an end user.

10. The form customization system of claim 8, wherein the XML editor is configured to edit XML code of the first XML format form based on an input received from an independent software vendor (ISV).

11. The form customization system of claim 8, wherein the import component is configured to store the customized XML format form as an XML layer on top of the associated first binary format form that was used to generate the first XML format form.

12. The form customization system of claim 8, wherein the XML layer is configured to be exported to a second database and applied to a binary format form in the second database corresponding to the first binary format form in the database.

13. The form customization system of claim 8, wherein the import component is configured to store the customized XML format form in the database as an XML layer without modifying the associated first binary format form stored in the database.

14. A computer-implemented method of customizing forms of an application, the method comprising:
   retrieving a first form, in a binary format, from a database, for customization;
   converting the first form from the binary format into an extensible markup language (XML) format to generate a first extensible markup language (XML) format form using a processor of a computer;
   customizing the first form by editing the first XML format form using an XML editor to generate a customized XML format form;
   receiving the customized XML format form generated by the XML editor using the first XML format form; and
   storing the customized XML format form as an XML layer on top of the first binary format form stored in the database such that the XML layer comprises a reference to the first binary format form stored in the database that was used to generate the first XML format form and includes XML code indicative of differences between the customized XML format form and the first XML format form.

15. The computer-implemented method of claim 14, wherein converting the first form from the binary format into the XML format further comprises deserializing the first form.

16. The computer-implemented method of claim 15, wherein storing the customized XML format form as an XML layer further comprises serializing the customized XML format form.

17. The computer-implemented method of claim 14, wherein storing the customized XML format form comprises storing the XML layer on top of the first binary format form without modifying the first binary format form stored in the database.

* * * * *